April 7, 1953   N. G. LINDSTRÖM   2,633,748
CALORIMETER
Filed Feb. 5, 1948   2 SHEETS—SHEET 1

Inventor
N. G. Lindström

Inventor
N. G. Lindström

Patented Apr. 7, 1953

2,633,748

UNITED STATES PATENT OFFICE 2,633,748

CALORIMETER

Nils Gottfrid Lindström, Stockholm, Sweden, assignor to Telefonaktiebolaget L M Ericsson, Stockholm, Sweden, a company of Sweden Application May 5, 1948, Serial No. 25,111
In Sweden May 27, 1947

5 Claims. (Cl. 73—193)

The present invention relates to a device for measuring velocities of flow or heat quantities transported by a running medium. The invention is based on the physical law that the heat transition constant between a running medium and a heat conducting body varies with the velocity of the medium, if the heat received by the body from the medium is conducted away to a heat distributor. The difference of temperature between the body and the medium is greatest when the velocity of the medium is zero and approaches zero when the velocity is increasing to infinite.

The medium is supposed to pass through a pipe and the invention consists partly in at least one heat conducting body being brought through a wall delimiting the medium and heat insulated from the wall and being in heat conducting connection with a heat distributor at another temperature than the medium, and partly in thermoelements, of which one is arranged to give an electro-motive force proportional to the difference of temperature between a point in said heat conducting connection and said heat distributor, and a second thermoelement is arranged to give an electro-motive force proportional to the difference of temperature between the medium and a point in the heat conducting connection and a further thermocouple gives a third electromotive force, which is proportional to the difference of temperature between the medium and said heat distributor, which three electro-motive forces through subtraction of the last mentioned from the sum of the two first-mentioned ones give an electrical current proportional to the velocity of the medium or the heat quantity passing through the pipe.

Figure 1:
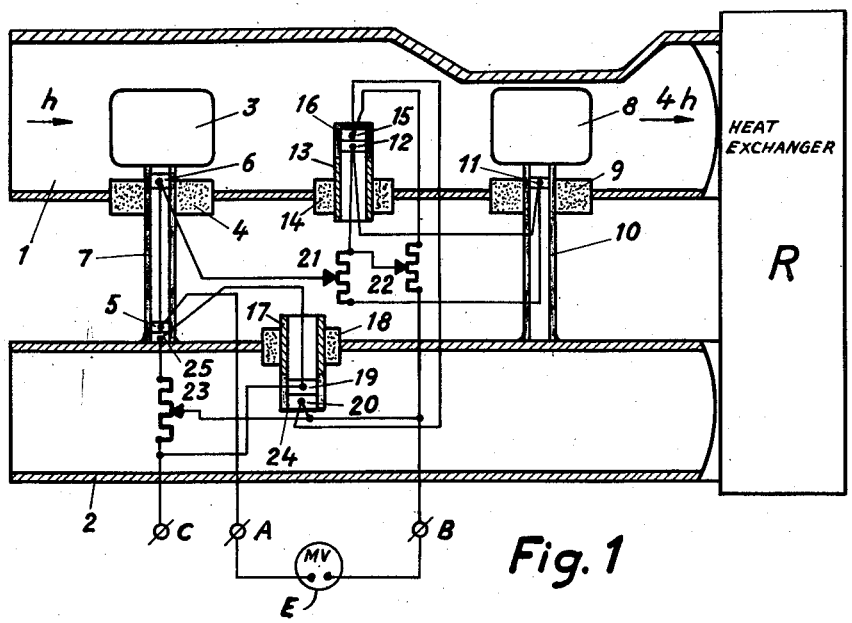
Figure 2:
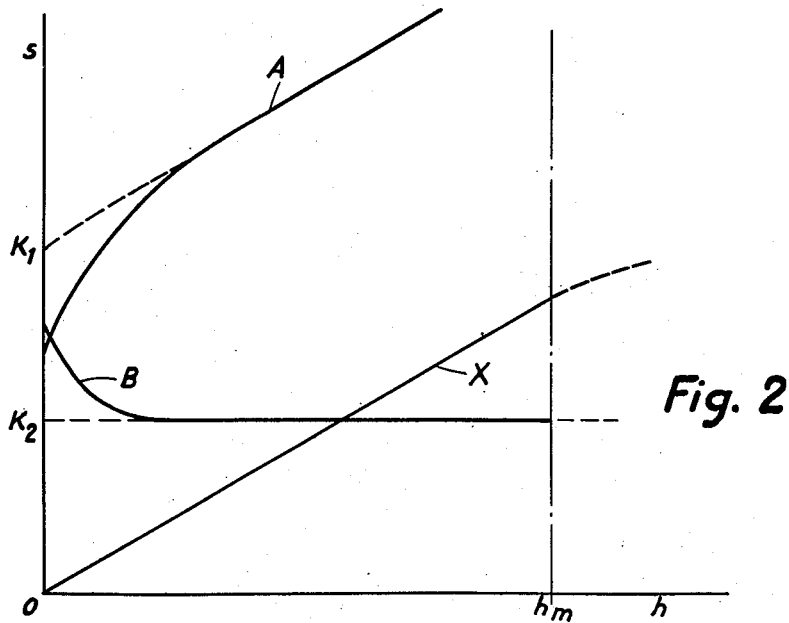
Figure 3:
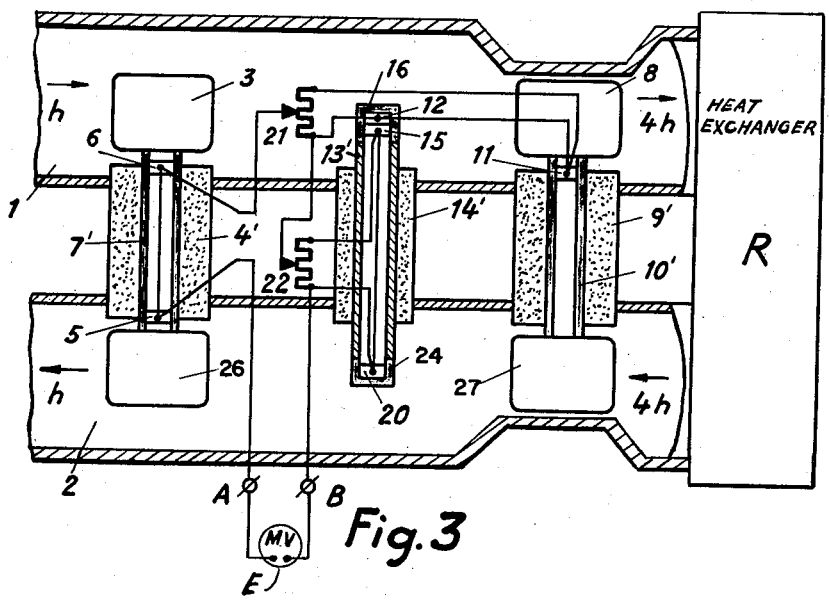
Figure 4:
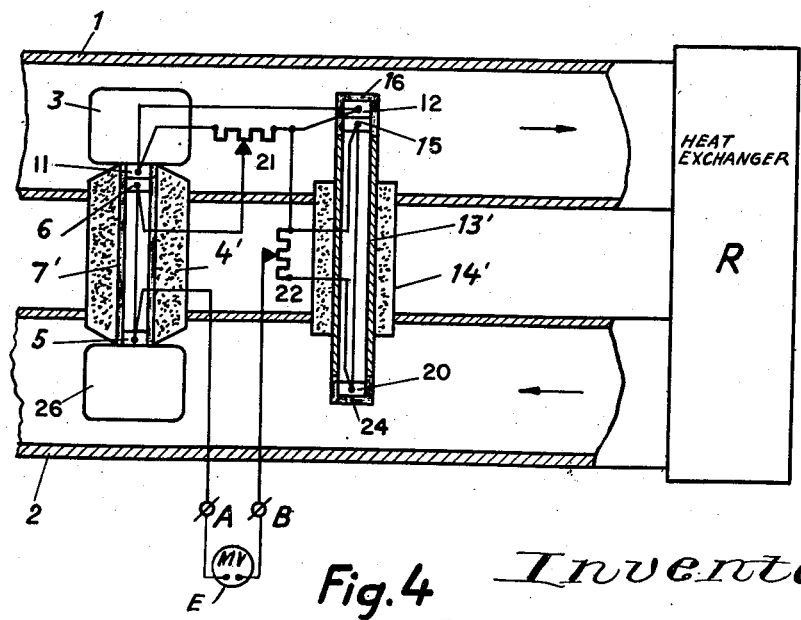

The invention will be described more closely by the aid of the annexed drawings. Fig. 1 shows an embodiment of the invention intended for calorimetry, whereby the outlet pipe from a heat exchanger constitutes the above-mentioned heat distributor. Fig. 2 shows a number of diagrams over the relations between the difference of temperature and the velocity of water within the calorimeter according to Fig. 1. Figs. 3–4 show two different embodiments of the invention, whereby the medium in the outlet pipe from a heat exchanger constitutes the heat distributor.

In Fig. 1, R is a heat exchanger with the feed pipe 1 and the outlet pipe 2. Between the pipes 1 and 2 there are two heat conducting contacts 7 and 10, which are heat insulated from the feed pipe 1 through the packings 4 and 9, but heat conducting connected, for instance welded to the outlet pipe 2. The contacts 7 and 10 may be metal tubes. At each of the metal tubes 7 and 10 a plate 3 or 8 respectively is fastened. These plates are parallel to the axis of the tube 1 and are suitably made of smooth glass. The pipe 1 has a constriction at the plate 8, so that the velocity of the medium here is about four times greater than at the plate 3. In the metal tubes 7 and 10 there are soldered junctions 6, 5 and 11 to thermocouples. Within each of the tubes 1 and 2 there are two other soldered junctions for thermoelements, 12 and 15 in the feed pipe 1, and 19 and 20 in the outlet pipe 2. The soldered junctions 12, 15, 19 and 20 are well insulated from the tubes 1 and 2 through packings 14 and 18, they are carried by "Bakelite" tubes 13 and 17 and embraced by copper cylinders 16 and 24, whereby they accurately will assume the same temperature as the medium in the tubes 1 or 2. The soldered junctions 5 and 6 form a thermocouple, which gives an electro-motive force varying between the water velocity $h$ in the tube 1 according to the curve A in Fig. 2, if the difference of temperature $t_v - t_k$ between the temperature of the medium in the tube 1 and its temperature in the tube 2 is constant. If the temperature $t_v - t_k$ is varying the ordinate for every point on the curve A varies in direct proportion to $t_v - t_k$.

The soldered junctions 11 and 12 form another thermoelement, which gives an electro-motive force varying with the water velocity $h$ in the tube 1 according to the curve B in Fig. 2, if the difference of temperature $t_v - t_k$ between the temperature of the medium in the tube 1 and its temperature in the tube 2 is constant. A part of this electro-motive force is tapped by means of an adjustable rheostat 21 and is so adjusted that the sum of the curves A and B will be a practically straight line. That this is possible has been proved experimentally. The curve B has an asymptote: $s = K_2$. If $A + B - K_2$ is formed, the dotted line which partly coincides with the curve A, is obtained through the point $K_1$.

The soldered junctions 15 and 20 form a third thermocouple, which gives an electro-motive force proportional to the difference of temperature $t_v - t_k$ between the temperature of the medium in the tube 1 and its temperature in the tube 2. A part of this voltage, which is constant if $t_v - t_k$ is constant, is selected by means of an adjustable rheostat 22 and is adjusted so, that it has the value:

$$s = K_1 + K_2$$

If the three above mentioned electro-motive forces are connected so that the last mentioned electro-motive force counteracts the sum of the two first-mentioned ones, the straight line X is obtained through the origin O. Experiments have shown that the curve X is regarded as a straight line until a certain limit, for example $hm$, which will correspond to the upper limit for the measuring range of the calorimeter.

If the difference of temperature $t_v-t_k$ between the temperature of the medium in the tube 1 and its temperature in tube 2 varies, all the above mentioned three thermocouples will be exposed to variations in the temperature, whereby a full proportionality between the differences of temperature acting on the thermocouples will exist at each value of the water velocity $h$, and thus the line X will change its angle coefficient linearly, when the difference of temperature $t_v-t_k$ is changed. It is here supposed that the tube 2 assumes the temperature $t_k$, which is the temperature of the medium in the tube 2, independent of the temperature of the neighborhood and the heat coming from the tube 1 through the metal tubes 7 and 10.

The electro-motive force from the thermocouples is conducted to the terminals A and B, to which an electrical indicating meter E is connected. The heat quantity Q, consumed in the device R or transmitted to the medium, can, if the medium is supposed to be water, be expressed by the formula:

$$Q = q \cdot (t_v - t_k)$$

where:

$q$ = the quantity of water, which per unit of time passes through the pipe 1
$t_v$ = the temperature of water in the pipe 1
$t_k$ = the temperature of water in the pipe 2

Now:

$$x = k_1 \cdot h$$

where:

$k_1$ = a constant
$x$ = the resulting electro-motive force of the thermocouples according to the curve X in Fig. 2 and $$q = k_2 \cdot h$$

where:

$k_2$ = a constant depending on the section area of the tube 1 and;
$h$ = the velocity of water in the tube 1 due to:

$$q = \frac{k_2}{k_1} \cdot x$$

According to the description above the angle coefficient for the line X varies linearly with the difference of temperature $(t_v-t_k)$ due to:

$$k_1 = k_3(t_v - t_k)$$

where $k_3$ = a constant

From this is obtained:

$$q = \frac{k_2}{k_3} \cdot \frac{x}{t_v - t_k}$$

and $$Q = k \cdot x$$

where $k$ = a constant

An electrolytic meter E connected to the terminals A—B can thus be so graduated that the heat quantity which is consumed or absorbed in R, can be read directly.

In the description above has been supposed that the tube 2 assumes the temperature of the medium independent of the temperature of the neighborhood and the heat transmitted from the tube 1. This supposition cannot be made always. It is however possible to compensate this with an accuracy sufficient for practical use by introducing the soldered junctions 19 and 25 into Fig. 1 and connecting these to a thermocouple, the electro-motive force of which is divided by means of a rheostat 23 so that an electro-motive force is obtained, which is fit for the compensation. If the temperature of the tube corresponds with the temperature of the medium the compensating electro-motive force is zero. If it is above or below the temperature of the medium the compensating electro-motive force should be added to or substracted from the electro-motive force prevailing between the terminals A and B. This is obtained automatically by the electromotive force from the thermocouple 19—25 changing magnitude and direction with the fall of temperature between the tube 2 and the medium in the tube 2 and can therefore be connected in series with the electro-motive force between the terminals A and B. In this case the electrolytic meter E should be connected between the terminals A and C.

Another manner to avoid influence from the temperature of the neighborhood and from the heat which is conducted through the metal tubes 7' and 10' from the tube 1 to the tube 2 is shown in Fig. 3. Here the copper tubes 7' and 10' are insulated through the packings 4' and 9' from the tube 1 as well as from the tube 2. Furthermore the copper tubes 7' and 10' are provided with glass plates 3, 8, 26 and 27 in the tube 2 as well as in the tube 1. The tubes 1 and 2 are equally thick and provided with a constriction at the plates 8 and 27. In the metal tubes 7'—10' there are soldered junctions 5, 6 and 11' for thermocouples. An only slightly heat conducting tube 13, which is insulated from the tubes 1 and 2 through the packing 14', carries two copper cylinder 16 and 24 containing soldered junctions 12, 15 and 20 for thermocouples. Above mentioned soldered junctions are connected together in pairs to form three thermocouples in conformity with the relations in Fig. 1. The thermocouple 5—6 gives an electro-motive force, which varies with the velocity of the medium in the tubes 1 and 2 according to the curve A in Fig. 2, the thermocouple 11—12 gives an electromotive force according to the curve B in Fig. 2 and the thermocouple 15—20 gives an electromotive force, which is $K_1+K_2$. The resulting electro-motive force between the terminals A—B varies according to the curve X in Fig. 2, if the electro-motive force of the last mentioned thermocouple counteracts the sum of the electromotive forces of the two remaining thermocouples.

Of course the tubes 1 and 2 in Fig. 3 may have different sections and the plates 26 and 27 may be made of metal instead of glass.

The embodiment can thus be varied considerably without departing from the scope of the invention.

Fig. 4 shows a simplified embodiment of the calorimeter according to Fig. 3. A metal tube 7' has on its opposite ends two plates 3 and 26 inserted one in the feed pipe 1 and one in the outlet pipe 2 of a heat exchanger R. The tube 7' is heat insulated through the packing 4' and contains three soldered junctions for thermocouples 5, 6 and 11. Further there is a slightly heat conducting tube 13', which is insulated by the packing 14' and which in each end carries a cap of metal, for example copper, 16 and 24, respectively. In the cap 16 there are two soldered junctions 12 and 15 and in the cap 24 a soldered junction 20 for thermocouples. The soldered junctions 5 and 6 form a theromocouple, which gives an electro-motive force varying with the velocity of a medium, for example water, running through the pipes 1 and 2, in conformity with the curve A in Fig. 2. The soldered junctions 11 and 12 form a thermocouple, the electro-motive force of which is determined by the velocity of the medium but in conformity with the curve B in Fig. 2. A third thermocouple is formed by the soldered junctions 15 and 20 and produces an electro-motive force proportional to the fall of temperature in the device R. While help of the rheostats 21 and 22 the three above mentioned electro-motive forces are so determined and combined that an approximately straight line curve X according to Fig. 2 is obtained for the relation between the resultant electro-motive force at the terminals A—B and the heat consumption or the heat emission from the heat exchanger R.

I claim:

1. In a device for measuring the heat transition in a heat exchanger having an inlet pipe for conducting heat medium thereto and an outlet pipe for conducting heat medium therefrom, shunt heat interchange means connected intermediate the inlet and outlet pipes and exposed to the heat medium in the former and in heat interchange relationship with the heat medium in the latter, heat conducting tubes projecting into said inlet and outlet pipes and heat insulated from said pipes, a first thermo-electrical device comprised by an element mounted in the shunt heat interchange means and adjacent the wall of the outlet pipe and a second element mounted in the shunt heat interchange means and exposed to the medium in the inlet pipe, a second thermo-electrical device comprised by an element mounted in the shunt heat interchange means and exposed to the medium in the inlet pipe and a second element mounted in the heat conducting tube in the inlet pipe, and a third thermo-electrical device comprised by an element also mounted in the heat conducting tube in the inlet pipe and a second element mounted in the heat conducting tube in the outlet pipe, an electrical circuit connecting the thermo-electrical devices so that the electro-motive forces developed by the first two thermo-electrical devices are cumulative and the electro-motive force developed by the third thermo-electrical device is in opposition to the total of the other two, and an electrical indicating instrument connected to the terminals of said electrical circuit.

2. In an apparatus for measuring the heat transition in a heat exchanger having an inlet pipe for conducting heat medium thereto and an outlet pipe for conducting heat medium therefrom, said inlet pipe having a constricted section therein, first and second heat interchange shunts connected intermediate the inlet and outlet pipes in heat interchange relationship with the outlet pipe, extending into the inlet pipe to be exposed to the heat medium therein and heat insulated from the wall of the inlet pipe, said second heat interchange shunt being partially disposed within the constricted section of the inlet pipe, heat conducting tubes projecting into said inlet and outlet pipes, respectively, and heat insulated therefrom, a first thermo-electrical device comprised by a junction mounted in the first heat interchange shunt and adjacent the wall of the outlet pipe and a second junction mounted in the first heat interchange shunt and adjacent the wall of the inlet pipe, a second thermo-electrical device comprised by a first junction mounted in the second heat interchange shunt and a second junction mounted in the heat conducting tube in the inlet pipe, and a third thermo-electrical device comprised by a junction also mounted in the heat conducting tube in the inlet pipe and a second junction mounted in the heat conducting tube in the outlet pipe, an electrical circuit connecting the three thermo-electrical devices so that the electro-motive forces developed by the first two thermo-electrical devices are cumulative, and the electro-motive force developed by the third thermo-electrical device is in opposition to the total of the other two, and an electrical indicating instrument connected to the terminals of said circuit.

3. In an apparatus for measuring the heat transition in a heat exchanger having an inlet pipe for conducting heat medium thereto, and an outlet pipe for conducting heat medium therefrom, said inlet pipe having a constricted section therein, first and second heat interchange shunts connected intermediate the inlet and outlet pipes in heat interchange relationship with the wall of the outlet pipe, extending into the inlet pipe to be exposed to the heat medium therein and heat insulated from the wall of the inlet pipe, said second heat interchange shunt being partially disposed within the constricted section of the inlet pipe, heat conducting tubes projecting into said inlet and outlet pipes, respectively, and heat insulated therefrom, a first thermo-electrical device comprised by a junction mounted in the first heat interchange shunt and adjacent the wall of the outlet pipe and a second junction mounted in the first heat interchange shunt and adjacent the wall of the inlet pipe, a second thermo-electrical device comprised by a first junction mounted in the second heat interchange shunt and a second junction mounted in the heat conducting tube in the inlet pipe, a third thermo-electrical device comprised by a junction also mounted in the heat conducting tube in the inlet pipe, and a second junction mounted in the heat conducting tube in the outlet pipe, a fourth thermo-electrical device comprised by a first junction mounted in the wall of the outlet pipe and a second junction mounted in the heat conducting tube in the outlet pipe, an electrical circuit connecting the four thermo-electrical devices so that the electro-motive forces developed by the first two thermo-electrical devices are cumulative, the electro-motive force developed by the third thermo-electrical device is in opposition to the other two and the electro-motive force developed by the fourth thermo-electrical device is in opposition to the total electro-motive force of the other three thermo-electrical devices when the temperature of the medium in the outlet pipe is higher than the temperature of the wall of the outlet pipe.

4. In an apparatus for measuring the heat transition in a heat exchanger having an inlet pipe for conducting heat medium thereto and an outlet pipe for conducting heat medium therefrom, a heat interchange shunt connected intermediate the inlet and outlet pipes extending through and heat insulated from at least one wall of the latter so as to be contacted at their respective ends by the heat medium in said pipes, heat conducting tubes projecting into said inlet pipes and heat insulated from the walls of the latter, a first thermo-electrical device comprised by first and second junctions mounted in the shunt heat interchange means adjacent the inlet and outlet pipes, respectively, a second thermo-electrical device comprised by a first junction mounted in the shunt heat interchange means adjacent the inlet pipe and a second junction mounted in the heat conducting tube in the inlet pipe, a third thermo-electrical device comprised by a first junction also mounted in the heat conducting tube in the inlet pipe and a second junction mounted in the heat conducting tube in the outlet pipe, an electrical circuit connecting the thermo-electrical devices so that the electromotive forces developed by the first two thermo-electrical devices are cumulative and the electromotive force developed by the third thermo-electrical device is in opposition to the total of the other two, and an electrical indicating instrument connected to the terminals of said electrical circuit.

5. In an apparatus for measuring the heat transition in a heat exchanger having an inlet pipe for conducting heat medium thereto and an outlet pipe for conducting heat medium therefrom, said inlet pipe having a constricted section therein, first and second heat interchange shunts connected intermediate the inlet and outlet pipes extending through and heat insulated from at least the wall of the inlet pipe so as to be contacted at their respective ends by the heat medium in the latter and in heat conducting relationship at their other ends with the heat medium in the outlet pipe, said second heat interchange shunt extending through the wall of the inlet pipe at the constricted section of the latter, heat conducting tubes projecting into said inlet and outlet pipes and heat insulated from the walls of the latter, a first thermo-electrical device comprised by a first junction mounted in the first shunt heat interchange means adjacent the inlet pipe and a second junction mounted in the first shunt heat interchange means adjacent the outlet pipe, a second thermo-electrical device comprised by a first junction mounted in the second shunt heat interchange adjacent the inlet pipe and a second junction mounted in the heat conducting tube in the inlet pipe, a third thermo-electrical device comprised by a first junction also mounted in the heat conducting tube in the inlet pipe and a second junction mounted in the heat conducting tube in the outlet pipe, an electrical circuit connecting the thermo-electrical devices so that the electro-motive forces developed by the first two thermo-electrical devices are cumulative and the electro-motive force developed by the third thermo-electrical device is in opposition to the total of the other two, and an electrical indicating instrument connected to the terminals of said electrical circuit.

NILS GOTTFRID LINDSTRÖM.

REFERENCES CITED

The following references are of record in the file of this patent:

UNITED STATES PATENTS

| Number | Name | Date |
| --- | --- | --- |
| 1,267,757 | Gibson | May 28, 1918 |

FOREIGN PATENTS

| Number | Country | Date |
| --- | --- | --- |
| 334,768 | Germany | Mar. 17, 1921 |
| 750,754 | France | June 6, 1933 |
| 802,704 | France | June 13, 1936 |